United States Patent [19]
Risser

[11] Patent Number: 5,326,964
[45] Date of Patent: Jul. 5, 1994

[54] SEPARABLE MULTI-ACCOUNT SAFETY CREDIT CARD

[76] Inventor: J. Marlin Risser, 801 Mill Rd., Elizabethtown, Pa. 17022

[21] Appl. No.: 29,171

[22] Filed: Mar. 10, 1993

[51] Int. Cl.⁵ .................. G06K 19/00; B42D 15/00
[52] U.S. Cl. ................... 235/487; 235/486; 283/904; 283/99; 283/72
[58] Field of Search ............. 283/72, 94, 99, 107, 283/904; 235/486, 487

[56] References Cited

U.S. PATENT DOCUMENTS

| | | | |
|---|---|---|---|
| 3,434,414 | 3/1969 | Wright | 283/99 X |
| 3,505,954 | 4/1970 | Projansky | 283/904 X |
| 3,583,317 | 6/1971 | Gibson | 283/904 X |
| 3,637,994 | 1/1972 | Ellingboe | |
| 4,614,861 | 9/1986 | Pavlov et al. | 235/380 |
| 4,667,087 | 5/1987 | Quintana | 235/380 |
| 4,879,455 | 11/1989 | Butterworth | |

*Primary Examiner*—Donald Hajec
*Assistant Examiner*—Jeffrey R. Filipek
*Attorney, Agent, or Firm*—Samuel M. Learned, Jr.

[57] ABSTRACT

A separable safety credit card which contains multiple account numbers and is mechanically detachable into two component parts whereby that part upon which is embossed the credit account numbers may be separately carried from the individual identification part thereof for purposes of safety and security so that if either component is lost or stolen the card may not be used by another in the making of unauthorized transactions.

3 Claims, 3 Drawing Sheets

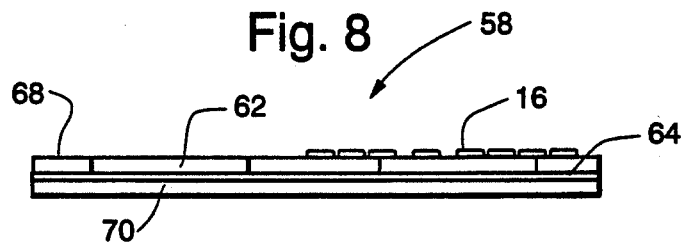
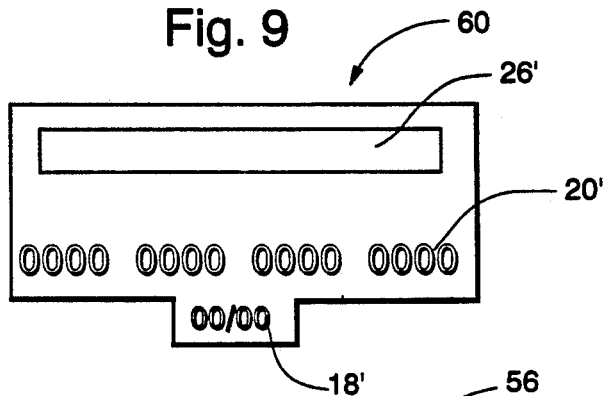
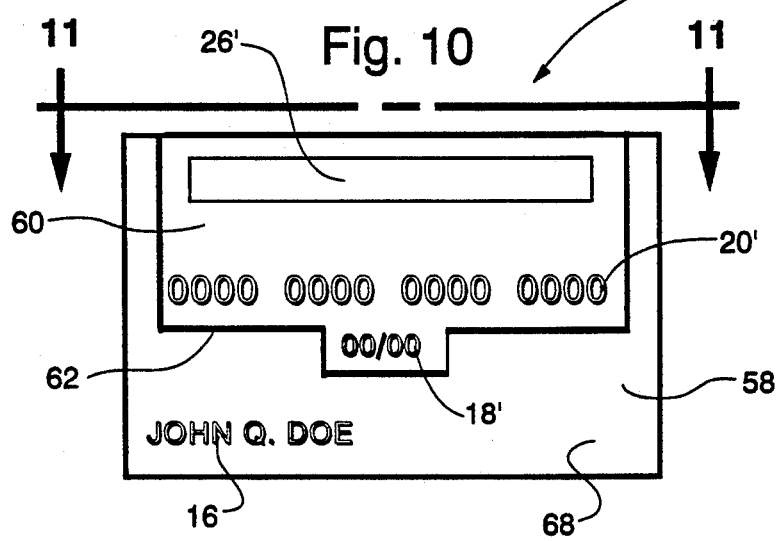
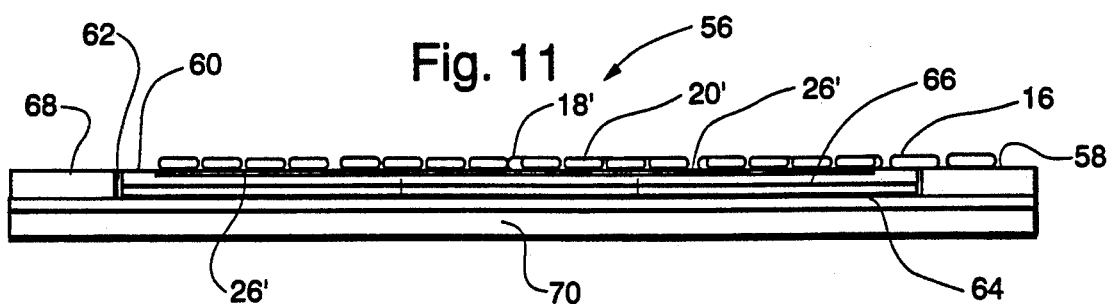

SEPARABLE MULTI-ACCOUNT SAFETY CREDIT CARD

BACKGROUND OF THE INVENTION

The present invention relates to credit card security, and in particular to a separable safety credit card which has at least two component parts that are carried separately and apart such that all components thereof must be mechanically joined to form a completed credit card for either mechanical or electronic transaction uses, whereby if one such component part is lost or stolen the credit card is of no use thereby preventing unauthorized transactions.

One of the current responses to combatting credit card fraudulent use are the so-called "Smart Card" devices, which are basically micro-computer credit cards that require the inputting of codes and account data for use such that unauthorized transactions in the event of loss or being stolen are prevented by virtue of the codes. Examples of the Smart Card devices are as respectively taught by Pavlov et al in U.S. Pat. No. 4,614,861 dated Sep. 30, 1986, Quintana in U.S. Pat. No. 4,667,087 dated May 19, 1987, and Butterworth et al in U.S. Pat. No. 4,879,455 dated Nov. 7, 1989, and although these devices are effective in providing increased credit card security, they may be of a cost and capability which substantially exceeds that which is attractive to the typical credit card user.

In the realm of multi-piece credit cards for security purposes, the teaching by Ellingboe in U.S. Pat. No. 3,637,994 dated Jan. 25, 1972, would be an example, however, such a card is designed to interface with electronic access mechanisms only as a means for accomplishing account transactions.

The present invention embodying a simple mechanical approach as will hereinafter be more fully detailed and explained, for enhancing credit card security by way of a multi-piece separable safety credit card, is a new and convenient way for providing a more practical approach for the typical credit card user to effectively deal with the hazard of credit card loss or theft and preventing subsequent unauthorized credit card use.

SUMMARY OF THE INVENTION

It is the principal object of the present invention to provide a separable safety credit card which is constructed such that it may be mechanically detached into at least two component parts which are then carried separately so that if either component part thereof is lost or stolen the card may not be thereafter employed by another in the use of making unauthorized transactions.

It is another object of the present invention to provide a separable safety credit card wherein one component part thereof contains multiple account numbers so that a single card may be selectively assembled to be used with more than one credit account.

It is also an object of the present invention to provide a separable safety credit card which may be employed with existing credit card embossing machines and electronic account access apparatus.

A further object of the present invention is to provide a separable safety credit card which is simple and rugged in construction, economic to manufacture, and is adapted for ease of use by an average person not possessed of special skills.

The foregoing, and other objects hereof, will be readily evident upon a study of the following specification and accompanying drawings comprising a part thereof.

BRIEF DESCRIPTION OF THE DRAWINGS

FIG. 8 is an end elevation view of the insert support component as shown in FIG. 7 and seen along the line 8—8 thereof.

FIG. 9 is a front view of the single account insert component of the alternate embodiment version of the separable safety credit card of instant invention.

FIG. 10 is a front view of the separable safety credit card alternate embodiment version of instant invention with the single account insert and insert support components thereof assembled for use.

FIG. 11 is an enlarged side elevation view of the assembled separable safety credit card alternate embodiment version of instant invention as shown in FIG. 10 and seen along the line 11—11 thereof.

DETAILED DESCRIPTION OF THE INVENTION

Figure 1:
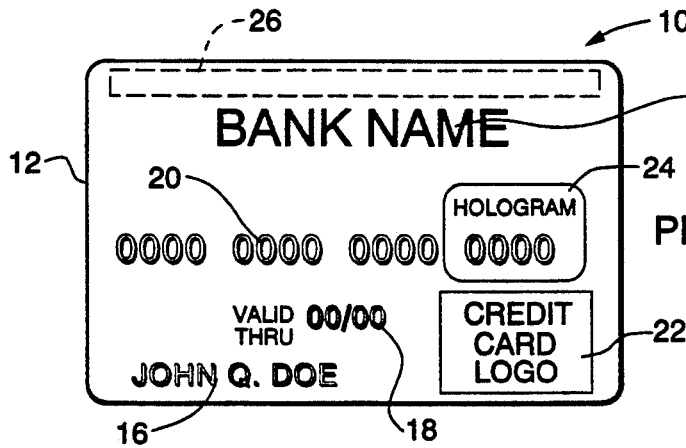
FIG. 1 is a front view of a typical prior art credit card.

Referring to FIG. 1, a typical prior art credit card 10 is shown in front view, upon the plastic body 12 of which are either imprinted or embossed various items of information such as the identity of the issuing bank 14, the name of the credit card holder 16, the credit card expiration date 18, the credit card account number 20, usually a credit card logo 22, and a hologram 24 imprinted over a portion of the account number 20 to thereby make tampering and alteration more obvious and difficult to accomplish. Also, on the back of the card 10 will usually be embedded an electro-magnetic data strip 26 so that the card may not only be used with typical credit card embossing machines but additionally in accessing accounts by way of electronic apparatus. Thus, the card 10, with information carried thereby may be used to transact both manual as well as electronic charge functions, by either the authorized card holder or someone who may either inadvertently or deliberately obtain possession thereof.

Figure 2:
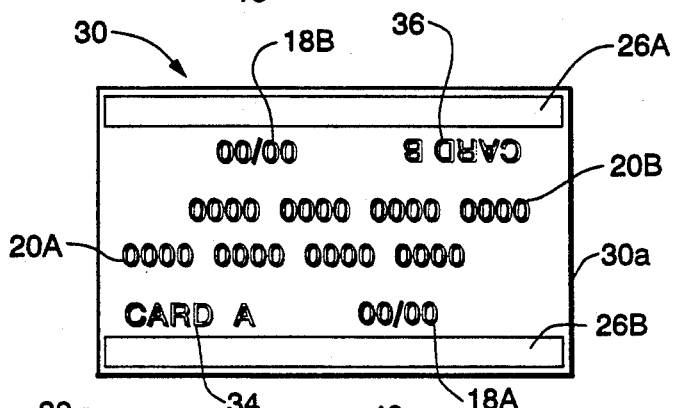
FIG. 2 is a front view of one side of the multi-account insert component of the separable safety credit card preferred embodiment of instant invention.
Figure 3:
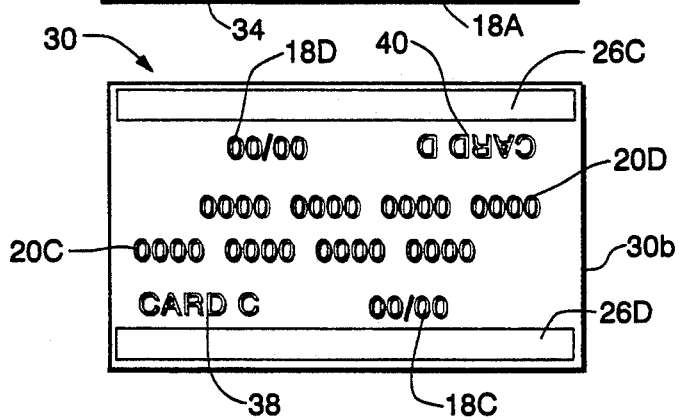
FIG. 3 is a front view of the other side of the multi-account insert component of the separable safety credit card preferred embodiment of instant invention.
Figure 4:
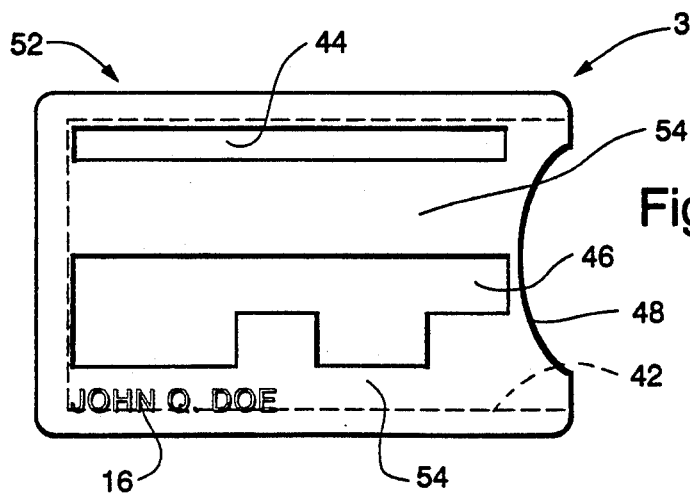
FIG. 4 is a front view of the sleeve component of the separable safety credit card preferred embodiment of instant invention.
Figure 5:
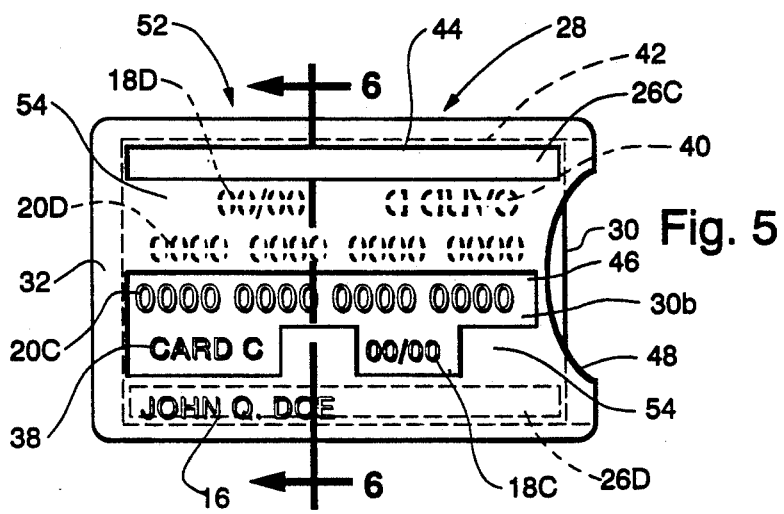
FIG. 5 is a front view of the separable safety credit card preferred embodiment of instant invention with the multi-account insert and sleeve components thereof assembled for use.

The component parts of the separable safety credit card 28 of instant invention, as shown assembled in FIG. 5, are illustrated in FIGS. 2 through 4, wherein FIGS. 2 and 3 respectively show front views of the two sides 30a and 30b of the multi-account insert component 30 of the separable safety credit card 28, and FIG. 4 shows a front view of the sleeve component 32 of said card 28.

Directing attention now to a concurrent consideration of FIGS. 2 and 3, respectively showing one and the other side of the multi-account insert component 30 of the preferred embodiment of the separable safety credit card 28, wherein the one side 30a thereof supports raised indicia identifying two separate accounts as indicated by the numeral 34 for the account designator of CARD A with its corresponding account number 20A and expiration date 18A plus the electro-magnetic data strip 26A therefor, as well as that account as indicated by the numeral 36 for the account designator of CARD B with its corresponding account number 20B and expiration date 18B plus the electro-magnetic data strip 26B therefor. With the orientation of the one side 30a of the multi-account insert component 30 as illustrated in FIG. 2 with respect to the sleeve component 32 as illustrated in FIG. 4, the insertable combination thereof would provide a separable safety credit card 28 similar to that as shown in FIG. 5 but for use with the designator account 34 of CARD A. The other side 30b of the multi-account insert component 30 supports raised indicia identifying an additional two separate accounts as indicated by the numeral 38 for the designator account of CARD C with its corresponding account number 20C and expiration date 18C plus the electro-magnetic data strip 26C therefor, as well as that account as indicated by the numeral 40 for the designator account of CARD D with its corresponding account number 20D and expiration date 18D plus the electro-magnetic data strip 26D therefor. With the orientation of the other side 30b of the multi-account insert component 30 as illustrated in FIG. 3 with respect to the sleeve component 32 as illustrated in FIG. 4, the insertable combination thereof would provide the separable safety credit card 28 as is shown in FIG. 5 for use with the designator account 38 of CARD C. Thus, when either one side 30a or the other 30b of the multi-account insert component 30 is held for insertable combination thereof with the sleeve component 32, that account wherein the CARD designator thereof appears upward when reading right will be the card account that the insertable combination of the insert component 30 with the sleeve component 32 will create. Also, in fulfillment of the principal object of this invention, so long as the insert component 30 and the sleeve component 32 are separate and apart, whether carried in such a manner by the authorized card holder, or whether one component or the other is lost or stolen, then unauthorized card use and either mechanical or electronic access to the respective accounts is prevented.

Figure 6:
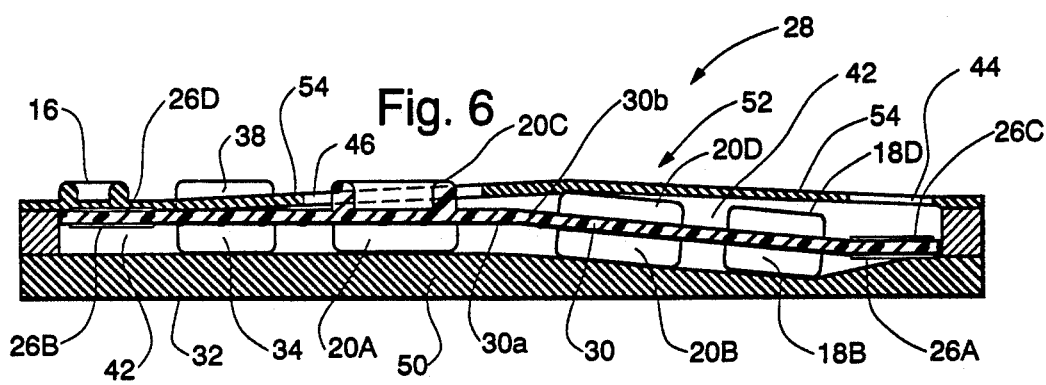
FIG. 6 is an enlarged side sectional view of the assembled separable safety credit card preferred embodiment of instant invention as shown in FIG. 5 and seen along the line 6—6 thereof.

The multi-account insert component 30 as illustrated in FIGS. 2 and 3 is employed in mechanical combination with the sleeve component 32 as shown in FIG. 4, whereby the sleeve component 32 provides an insert pocket 42 for receiving and supporting the insert component 30 when assembling the separable safety credit card 28 for use as shown in FIGS. 5 and 6. The sleeve component 32 bears the credit card holder's name 16 in raised lettering as shown, and the face thereof provides an electro-magnetic data strip cut-out window 44 as well as a credit card account number expiration date account designator cut out window 46 whereby the designated account access data and information in combination with the name of the card holder is assembled and presented in a functional credit card format as shown in FIG. 5, and only that account access data and information for the designated account is rendered available.

Considering now the separable safety credit card 28 view as shown in FIG. 5, which illustrates the card 28 assembled for use with the account designator CARD C 38 of the multi-account insert component 30 insertably installed within the sleeve component 32, whereby the sleeve recess 48 thereof provides facilitated access to the sleeve component 32 for insertion and removal of the multi-account insert component 30. It will be noted, as better illustrated in FIG. 6, that the one side 30a of the multi-account insert component 30 faces the sleeve component back 50 and is covered thereby, while the other side 30b faces the sleeve component front 52 with the non-designated account CARD D 40 access data and information being covered by the sleeve component front cover 54.

The separable safety credit card 28 as shown and illustrated in FIG. 5, and the respective parts thereof being the multi-account insert component 30 and the sleeve component 32, are preferably formed from a suitable plastic material, or combinations of plastics and other materials as appropriate, by methods and techniques commonly employed in such operations and well known in the art.

Figure 7:
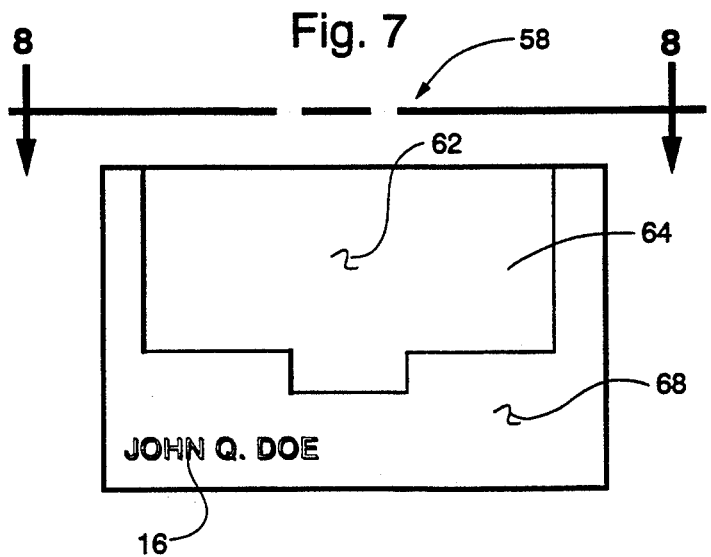
FIG. 7 is a front view of the insert support component of an alternate embodiment version of the separable safety credit card of instant invention.

Referring now to FIGS. 7 through 11, which show an alternate embodiment of the instant invention, being a single account separable safety credit card 56 as shown in FIGS. 10 and 11, comprised of an insert support component 58 as shown in FIGS. 7 and 8, and a single account insert component 60 as shown in FIG. 9. Again, in fulfillment of the principal object of this invention, so long as the insert component 60 and the support component 58 are separate and apart, whether carried in such a manner by the authorized card holder, or whether one component or the other is lost or stolen, then unauthorized card 56 use and either mechanical or electronic access to the account is prevented.

In the case of the single account separable safety credit card 56, the insert support component 58 as shown in FIGS. 7 and 8 utilizes a rectangular shape keyed slot 62 to supportably receive in registered cooperative coincidence therewithin the complementary shaped single account insert component 60 as shown in FIG. 9, the respective components 58 and 60 of which are mechanically held releasably in such registered cooperative coincidence by means of the support co-acting magnet 64 and insert co-acting magnet 66 as best shown in such use in the enlarged side elevation view of the operationally assembled single account separable safety credit card 56 in FIG. 11. As also noted in FIGS. 7 and 8, the insert support component 58 further includes the name of the credit card holder 16 as shown, as well as the insert component keyed slot receiver 68 and a support component base 70 upon which the support co-acting magnet 64 and insert component keyed slot receiver 68 are mounted.

The single account insert component 60 is as shown in FIG. 9, and upon registered insertion within the rectangular shape keyed slot 62 as illustrated in FIGS. 10 and 11, being operationally but releasably held in such position within the insert component keyed slot receiver 68 by means of the cooperatively co-acting magnets 64 and 66, functions to provide an assembled single account separable safety credit card 56 for use in the conduct of either mechanical or electronic credit card transactions.

Although the separable safety credit card invention hereof, the structural characteristics and method of employment thereof, respectively have been shown and described in what is conceived to be the most practical and preferred embodiment as well as an alternate embodiment thereof, it is recognized that departures may be made respectively therefrom within the scope of the invention, which is not to be limited per se to those specific details as described herein but is to be accorded the full scope of the claims so as to embrace any and all equivalent such devices, apparatus, and methods.

I claim:

1. A separable safety credit card having separate component parts therefor which are required to be mechanically assembled for credit card use, said card comprising in combination a sleeve component adapted to insertably receive and positionally support a multi-account insert component, and cut-out means provided within said sleeve component to selectively display from said multi-account insert component an account designator and a corresponding account number with an expiration date therefor, and an electro-magnetic data strip also corresponding to said account designator.

2. A separable safety credit card according to claim 1 wherein said sleeve component has a front cover within which is provided said cut-out means.

3. A separable safety credit card according to claim 2 wherein a credit card holder name is imprinted upon said sleeve component front cover.

* * * * *